Patented Nov. 1, 1927.

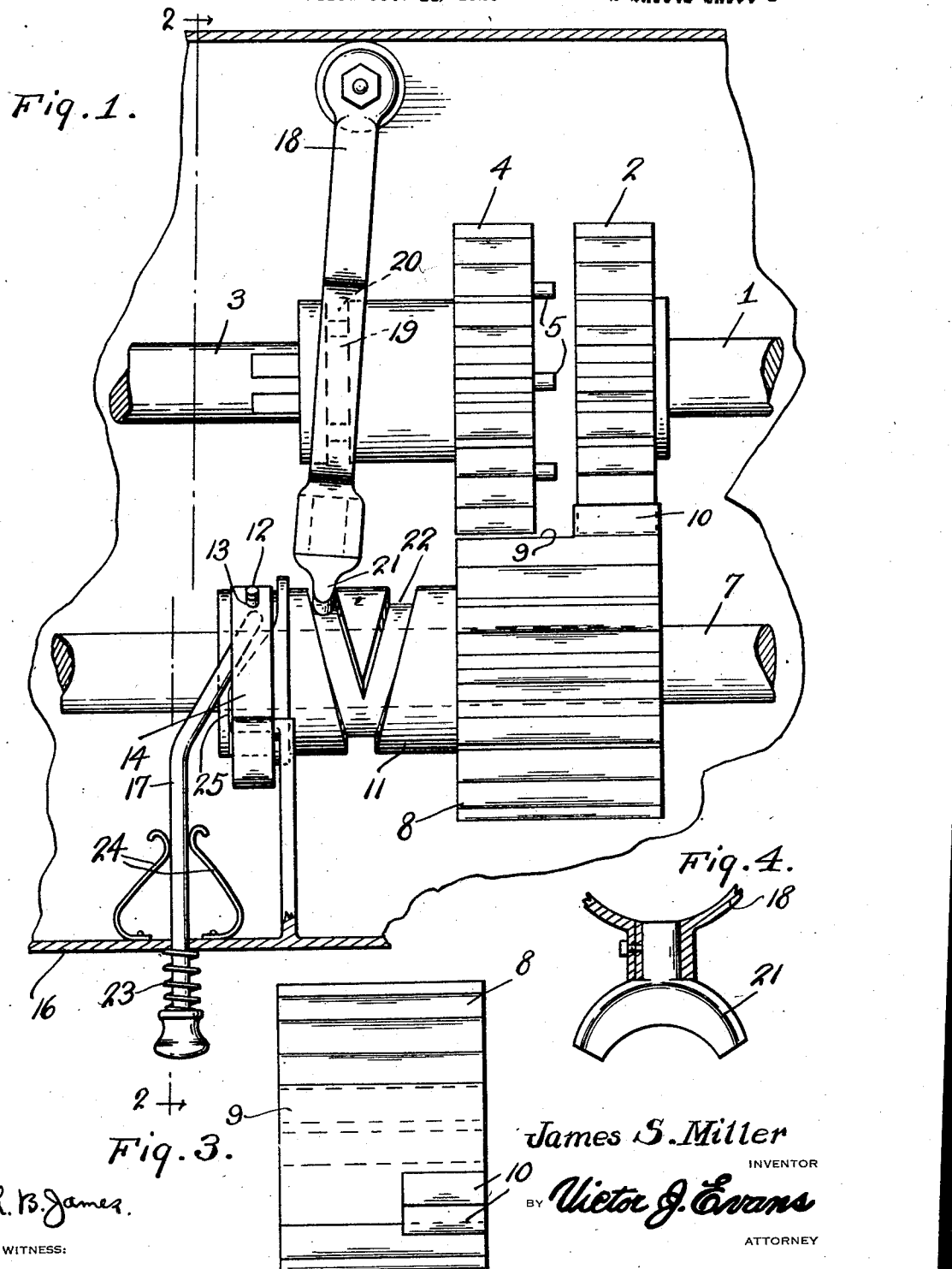

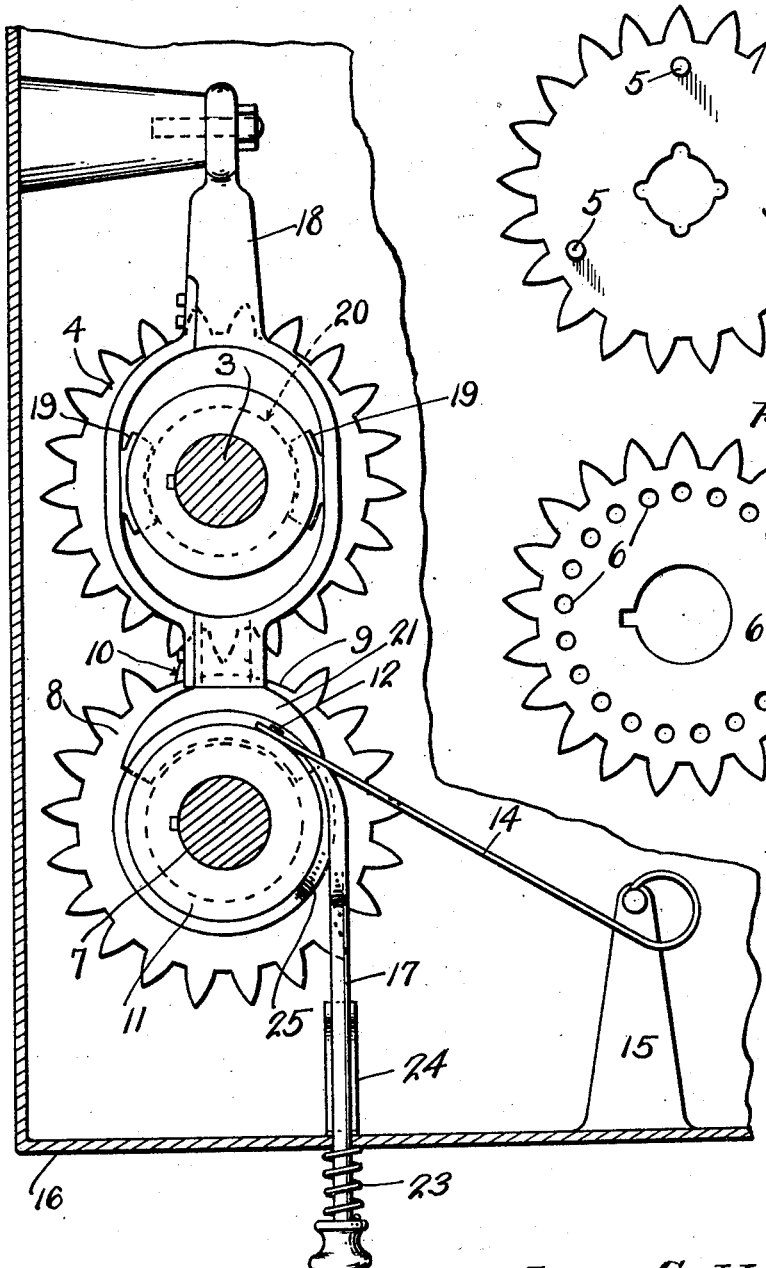

1,647,879

UNITED STATES PATENT OFFICE.

JAMES S. MILLER, OF BEDFORD, INDIANA.

CLUTCH.

Application filed October 18, 1926. Serial No. 142,423.

This invention relates to a gear clutch, the general object of the invention being to provide means for driving a driven shaft from a drive shaft through means of a mutilated gear, which is placed in mesh with a gear on the drive shaft by manual means and the resulting movement of the idle gear will place it in mesh with a gear on the driven shaft so that the said shaft will be driven from the drive shaft.

Another object of the invention is to provide clutch means for connecting the gears on the drive shaft and driven shaft together, with means actuated by the movement of the idle gear to move the clutch means into operative position and to move such means into inoperative position by the next movement of the idle gear.

A further object of the invention is to provide a lock for holding the mutilated gear with its plain part opposite the other gears, with a push rod for releasing the locking means and for moving the idle gear into mesh with the gear on the drive shaft.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the invention, with the parts out of active position.

Figure 2 is a section on line 2—2 of Figure 1.

Figure 3 is a view of the idle gear.

Figure 4 is a fragmentary view showing the shoe on the lower end of the shifting yoke.

Figure 5 is a face view of the driven gear.

Figure 6 is a face view of the drive gear.

In these views, 1 indicates the drive shaft which has a gear 2 secured thereto and 3 indicates the driven shaft, which has a gear 4 slidably and non-rotatably mounted thereon. The gear 4 is provided with the pins 5 on its outer face which are adapted to engage holes 6 in the outer face of the gear 2 so as to fasten the two gears together and thus cause the shaft 3 to rotate at the same speed as the shaft 1.

A shaft 7 carries a mutilated idle gear 8, the plain portion of the said gear being shown at 9, and a pair of half length teeth 10 is arranged adjacent this plain portion. The gear 8 is provided with an extension hub 11, the outer end of which carries a pin 12 which is adapted to enter a hole 13 in a spring member 14 which is fastened to a post 15 arranged in the gear casing 16. This spring and pin will hold the idle gear in a position with its plain part opposite the gears 2 and 4 so that the gears are out of mesh and with the half teeth 10 located close to the gear 2 so that a slight movement of the idle gear will place the half teeth in contact with the gear 2. This movement of the idle gear is imparted to it through means of a push rod 17 slidably supported in the casing 16 and having its offset end arranged under the spring member 14 and adjacent the pin 12 so that when the rod is pushed upon it will first lift the spring member 14 out of engagement with the pin 12 and then it will strike the said pin and give the idle gear a sufficient movement to place the half teeth 10 in contact with the gear 2. This will cause the idle gear to be rotated by the gear 2 and thus the full length teeth of the idle gear will engage the gear 4 so that movement will be imparted to the said gear and the shaft 3. A yoke lever 18 is pivotally mounted in the casing and has its shoes 19 engaging a groove 20 in the hub of the gear 4 and a shoe 21 is swiveled to the lower end of the lever and engages the cross groove 22 in the hub 11 so that as the idle gear rotates, the lever 18 is shifted by the engagement of its shoe 21 with the cross groove 22 so that the gear 4 is moved toward the gear 2 to cause the pins 5 to enter some of the holes 6 in the gear 2 and thus the two gears will be fastened together and the shaft 3 will be driven from the shaft 1. When the idle gear has made a complete revolution, the spring member 14 will engage the pin 12 again and thus lock the idle gear in a position where its plain part is opposite the gears 2 and 4, but as the lever 18 has moved the pins of the gear 4 into the holes of the gear 2, the shaft 3 will continue to be rotated from the shaft 1.

When the driven shaft is to be released from the drive shaft, it is simply necessary to again actuate the push rod 17 to release the lock and give the idle gear a slight movement so that it will again mesh with the gear 2 and then with the gear 4. This will relieve the pins 5 from the strain of the load and at the same time the lever 18 will be moved away from the gear 4 by the cross groove 22 so that the pins will be drawn out of the holes and thus when the idle gear comes to rest again, the driven shaft will be disconnected from the drive shaft.

A coiled spring 23 is placed on the push rod to return it to its normal position after being pushed in and curved springs 24 are used to hold the push rod with its end opposite the pin. However, as soon as the idle gear starts to rotate, a cam 25 on the hub 11 will engage the offset end of the push rod and move it away from the pin and the spring member 14 so that the spring member can engage the pin when the idle gear completes its revolution.

The shafts are suitably journaled in the casing 16.

It will thus be seen that I have provided a simple form of clutch means for connecting a drive shaft with a driven shaft, the operation of the clutch being caused by a slight movement on a push rod or the like, this same movement also acting to disengage the clutch means. The clutch may be used in different locations, such as in mills, factories and the like where it is necessary to provide means to quickly stop the machinery. It can also be used on an air pump to connect the pump to a line shaft, and in this case the push rod could be operated by the high or low pressure in the storage tank. Of course, I do not wish to be limited to the use of the invention.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a drive shaft and a driven shaft, a gear on each shaft, a mutilated idle gear having its plain part opposite the said gears, said idle gear having a number of short teeth arranged adjacent the plain part for engaging the drive gear when the idle gear is given a slight forward movement so as to cause the idle gear to be driven by the drive gear and thus placed in mesh with the driven gear and means for giving the idle gear its initial movement.

2. In combination with a drive shaft and a driven shaft, a gear on each shaft, a mutilated idle gear having its plain part opposite the said gears, said idle gear having a number of short teeth arranged adjacent the plain part for engaging the drive gear when the idle gear is given a slight forward movement so as to cause the idle gear to be driven by the drive gear and thus placed in mesh with the driven gear, means for giving the idle gear its initial movement, such means consisting of a push rod for engaging a part on the idle gear.

3. In combination with a drive shaft and a driven shaft, a gear on each shaft, a mutilated idle gear having its plain part opposite the said gears, said idle gear having a number of short teeth arranged adjacent the plain part for engaging the drive gear when the idle gear is given a slight forward movement so as to cause the idle gear to be driven by the drive gear and thus placed in mesh with the driven gear, means for giving the idle gear its initial movement, such means consisting of a push rod for engaging a part on the idle gear and a lock for holding the idle gear with its mutilated part opposite the other gears, said lock being moved to inoperative position when the push rod is operated.

4. In combination with a drive shaft and a driven shaft, a gear on each shaft, a mutilated idle gear having its plain part opposite the said gears, said idle gear having a number of short teeth arranged adjacent the plain part for engaging the drive gear when the idle gear is given a slight forward movement so as to cause the idle gear to be driven by the drive gear and thus placed in mesh with the driven gear, means for giving the idle gear its initial movement, such means consisting of a push rod for engaging a part on the idle gear, a lock for holding the idle gear with its mutilated part opposite the other gears, said lock being moved to inoperative position when the push rod is operated and means for connecting the driven gear with the drive gear by the operation of the idle gear and for disconnecting such gears upon the next operation of the idle gear.

5. In combination with a drive shaft and a driven shaft, a gear on each shaft, an idle gear having a plain part, means for normally holding the idle gear with its plain part opposite the other gears, said idle gear having some of its teeth arranged to engage the drive gear when the idle gear is given an initial movement, means for giving the idle gear this initial movement, clutch means between the drive gear and driven gear and means for moving such clutch means into operative position on the first movement of the idle gear and for moving the clutch means into inoperative position on the next movement of the idle gear.

6. In combination with a driven shaft and a drive shaft, a gear on each shaft, the gear on the driven shaft being slidably but nonrotatably mounted thereon, a projection on the driven gear adapted to engage a part of the drive gear when the driven gear is moved toward the drive gear, a clutch lever connected with the driven gear for sliding the same on its shaft, a mutilated idle gear having its plain part opposite the gears, said idle gear having a pair of short teeth thereon arranged adjacent the plain part for engaging the drive gear when the idle gear is moved slightly, a shaft for the idle gear, an extension hub connected with the idle gear, said hub having a cross slot therein, a part on the clutch lever engaging the slot, a push rod for giving the idle gear its initial movement, means for locking the idle gear in a position with its mutilated part opposite the other gears, said locking means being moved into inoperative position by the actuation of the push rod and means for moving the push rod from under the locking means so that said means can operate after the idle gear has made a complete revolution.

In testimony whereof I affix my signature.

JAMES S. MILLER.